United States Patent [19]

Arai et al.

[11] 3,956,168

[45] May 11, 1976

[54] LIQUID CRYSTAL COMPOSITIONS

[75] Inventors: Yoshi Arai, Oyama; Shoichi Kinoshita, Omiya; Kazuo Kimura, Tokyo; Tomio Wada, Nara; Hisashi Yamamoto; Fumiaki Funada, both of Tenri, all of Japan

[73] Assignees: Dainippon Ink and Chemicals, Incorporated, Tokyo; Dainippon Ink Institute of Chemical Research, Saitama; Sharp Corporation, Osaka, all of Japan; a part interest to each

[22] Filed: Sept. 4, 1973

[21] Appl. No.: 394,074

[30] Foreign Application Priority Data

Sept. 5, 1972  Japan.............................. 47-88393

[52] U.S. Cl................................ 252/299; 252/408; 350/150; 350/160 LC
[51] Int. Cl.$^2$......................................... G02F 1/16
[58] Field of Search.......................... 252/299, 408; 350/160 LC, 150

[56] References Cited

UNITED STATES PATENTS

| | | | |
|---|---|---|---|
| 3,499,112 | 3/1970 | Heilmeier et al. | 252/299 |
| 3,656,834 | 4/1972 | Haller et al. | 252/408 |
| 3,697,150 | 10/1972 | Wysochi | 252/299 X |
| 3,803,050 | 4/1974 | Haas et al. | 252/408 |
| 3,809,456 | 5/1974 | Goldmacher et al. | 252/408 |
| 3,814,700 | 6/1974 | Aviram et al. | 252/408 |
| 3,816,113 | 6/1974 | Haas et al. | 252/408 |
| 3,816,533 | 6/1974 | Brandstrom et al. | 252/408 |
| 3,838,059 | 9/1974 | Wong | 252/299 |

*Primary Examiner*—Leland A. Sebastian
*Assistant Examiner*—T. S. Gron
*Attorney, Agent, or Firm*—Sherman & Shalloway

[57] ABSTRACT

A liquid crystal composition comprising a nematic liquid crystal and a quaternary ammonium compound selected from the group consisting of the quaternary ammonium salts of carboxylic acids and the quaternary ammonium hydroxides.

15 Claims, No Drawings

LIQUID CRYSTAL COMPOSITIONS

This invention relates to liquid crystal compositions. More particularly, the invention relates to liquid crystal compositions comprising a nematic liquid crystal and a specific quaternary ammonium compound.

As is well known, when a space between transparent electrodes of sheet form is completely filled with a nematic liquid crystal to form a transparent thin layer, and the two sides of the thin layer is impressed with an electric potential while causing the entry of light from one side of the thin layer, the thin layer is rendered turbid by the impressed voltage, with the consequence that there is observed a phenomenon of interception of the passage of light. Researches in which this phenomenon is being utilized in the production of a light intercepting apparatus for intercepting light or an apparatus for displaying characters, symbols or figures by impressing the thin layer of liquid crystal with a voltage is being actively carried out at the present time.

However, the nematic liquid crystals known heretofore had the following shortcomings.

1. When a voltage, and especially a low voltage, is impressed, the degree of turbidity is low, and hence high interception effects cannot be obtained when used in a light interception apparatus. On the other hand, when the conventional nematic liquid crystals are used in a display apparatus, it is not possible to obtain a high contrast between the zone impressed with the voltage and the zone not impressed therewith.

2. The speed of response is slow. THe rise time, i.e., the time the thin layer becomes turbid and the light transmittance becomes the minimum when the voltage is impressed, and the drop time, i.e., the time required for the light transmittance to revert to its former state when the application of the voltage is stopped, are long.

3. Turbidity takes place when a direct current voltage or an alternating current voltage of low frequency is impressed, but turbidity does not take place when an alternating current voltage of high frequency is impressed.

The object of the present invention resides in improving on these shortcomings of the nematic liquid crystals.

We found that a composition obtained by adding either a quaternary ammonium salt of a carboxylic acid or a quaternary ammonium hydroxide as an additive to the nematic liquid crystal was in conformance with the foregoing object of the present invention. That is to say, these additives enhance the degree to which the nematic liquid crystal becomes turbid when impressed with an electric potential, this being achieved without shortening the life of the nematic liquid crystal nor causing a drop in the transition temperature between the nematic liquid crystalline state and the crystalline state. In addition, not only in the speed of response quickened by the addition of these additives, but it also becomes possible to cause the nematic liquid crystal to become turbid even when an alternating current voltage of high frequency is impressed. Hence, there is provided in accordance with this invention a liquid crystal composition comprising a nematic liquid crystal and a quaternary ammonium compound selected from the group consisting of the quaternary ammonium salts of carboxylic acids and the quaternary ammonium hydroxides.

The phenomenon of the nematic liquid crystal forming the thin layer between two sheets of electrodes becoming turbid on being impressed with an electric potential is believed to be due to a random movement of the molecules being set up inside the liquid crystal as a result of a flow of ion, i.e., an electric current, being set up therein when it is impressed with an electric potential.

The reason why the aforementioned effects are obtained in this invention by the addition of the additives is conceived to be due to the fact that as a result of the dissolution of the additive in the nematic liquid crystal the flow of ions when impressed with an electric potential, i.e., the electric current, is increased, with the consequence that the inductance is enhanced.

The quaternary ammonium salts of mono and dicarboxylic acids to be used as an additive in this invention are compounds having the group expressed by the formula

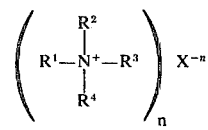

wherein X is a monofunctional carboxylate anion when $n$ is 1 and a difunctional carboxylate anion when $n$ is 2, wherein $n$ is 1 or 2, and
wherein $R^1$, $R^2$, $R^3$ and $R^4$ are each a hydrocarbon group. As examples, mention can be made of the quaternary ammonium salts of the aliphatic monocarboxylic acids such as formic acid, acetic acid, propionic acid, butyric acid, isobutyric acid, valeric acid, pivalic acid, lauric acid, acrylic acid, propiolic acid and methacrylic acid; the quaternary ammonium salts of the aliphatic dicarboxylic acids such as oxalic acid, malonic acid, succinic acid, maleic acid and fumaric acid; the quaternary ammonium salts of the carbocyclic monocarboxylic acids such as benzoic acid, p-chlorobenzoic acid, p-methylbenzoic acid, p-ethylbenzoic acid, p-methoxybenzoic acid, p-ethoxybenzoic acid, p-butoxybenzoic acid, p-nitrobenzoic acid, 2,4-dinitrobenzoic acid, p-aminobenzoic acid, p-chlorobenzal-p'-aminobenzoic acid, p-methoxybenzal-p'-aminobenzoic acid, p-carboxylbenzalamino-p'-chlorobenzene, p-hydroxybenzoyl-p'-oxybenzoic acid, p-methoxybenzoyl-p'-oxybenzoic acid, p-hydroxybenzoyl-p'-oxybenzoyl-p''-oxybenzoic acid, cinnamic acid, trans-p-phenylcinnamic acid, trans-p-acetoxycinnamic acid and trans-p-methoxycinnamic acid; and the quaternary ammonium salts of the carbocyclic dicarboxylic acids such as phthalic acid, isophthalic acid and terephthalic acid. By the expression "quaternary ammonium salts of carbocyclic dicarboxylic acids" is meant that in which at least one of the two carboxyl groups of a carbocyclic dicarboxylic acid is a quaternary ammonium salt.

On the other hand, the quaternary ammonium hydroxides to be used as an additive in this invention are compounds having the formula

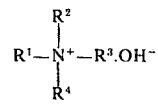

wherein R¹, R², R³ and R⁴ are each a hydrocarbon group.

As the hydrocarbon groups R¹, R², R³ and R⁴ that are attached to the nitrogen atom in the foregoing quaternary ammonium compounds, preferred are those of 1 – 20 carbon atoms. Examples include the chain hydrocarbon groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl, and the cyclic hydrocarbon groups such as phenyl, tolyl, xylyl and benzyl; preferred being that in which at least one of the hydrocarbon groups R¹, R², R³ and R⁴ is a hydrocarbon group of at least 3 carbon atoms.

The quaternary ammonium compound is added in an amount of 0.001 – 0.5% by weight, and preferably 0.003 – 0.1% by weight, based on the nematic liquid crystal.

The aforementioned quaternary ammonium compounds are effectively used with all of the nematic liquid crystals. For instance, satisfactory results are had when these quaternary ammonium compounds are added to the azoxy compounds such as p-azoxyanisole, the saturated benzolmonocarboxylic acid type compounds such as p-butoxybenzoic acid, the carbonate type compounds such as butyl-4-(4-ethoxyphenylcarbonyl)phenylcarbonate, and the azomethine type compounds such as p-alkoxybenzal-p'-butylaniline, anisylidene-p-aminophenylacetate and amylcyanobenzalaminocinnamate. An especially useful nematic liquid crystal for use in this invention is a mixture of liquid crystals consisting of p-methoxybenzal-p'-butylaniline of the formula

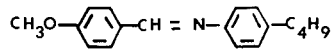

and at least one p-alkoxybenzal-p'-butylaniline having an alkoxy group of 2 – 12 carbon atoms of the formula

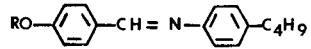

wherein RO— is an alkoxy group having 2 – 12 carbon atoms, the weight ratio of the former to the latter ranging between 10 : 90 and 85 : 15. Since this liquid crystal mixture exhibits a nematic liquid crystal state at a temperature in the range of −25° – 70°C., this liquid crystal mixture is stable over a very broad range of temperature at room temperature on addition of the hereinbefore-described quaternary ammonium compound. Hence, it becomes possible to obtain a liquid crystal composition which, when impressed with an electric potential, not only becomes turbid to a greater degree, but also whose speed of response is prompt, as well as which can also be made turbid when impressed with an alternating current voltage of high frequency.

The following examples are given for more specifically illustrating the present invention.

EXAMPLE 1

A liquid crystal mixture consisting of 32.4% by weight of p-methoxybenzal-p'-butylaniline, 36.0% by weight of p-ethoxybenzal-p'-butylaniline, 21.6% by weight of p-butoxybenzal-p'-butylaniline and 10.0% by weight of p-dodecyloxybenzal-p'-butylaniline is prepared. This mixture is in a liquid crystal state at temperatures ranging between −13° and 66°C.

Two sheets of glass each of whose surface is provided with a transparent electrode consisting of a thin film of tin oxide are prepared. These two sheets of glass are arranged in parallel to each other with the transparent electrodes facing inwardly to form a cell in which the interval between the electrodes is 25 microns. Then after adding to the hereinbefore-described liquid crystal mixture as additive the various quaternary ammonium compounds in varying proportions to prepare several liquid crystal compositions containing the quaternary ammonium compounds in varing proportions, the resulting liquid crystal compositions and the liquid crystal mixture not incorporated with a quaternary ammonium compound are each used for completely filling the foregoing cell to thus form transparent thin layers. A direct current of 25 volts is then applied across the transparent electrodes. The current flowing between the electrodes, the speed of response at the time the transparent thin layer becomes turbid, and the light transmittance at the time the transparent thin layer became turbide are measured, with the results shown in Table 1.

Table 1

| Additive | Amount added (wt.%) | Current (μA/cm²) | Speed of response Rise time (sec) | Speed of response Decay time (sec) | Light transmittance (%) |
|---|---|---|---|---|---|
| — | — | 0.06 | 0.25 | 3.1 | 48 |
| Tetrabutylammonium salt of benzoic acid  | 0.05 | 40 | 0.12 | 1.0 | 24.3 |
| | 0.1 | 60 | 0.11 | 0.9 | 28.0 |
| | 0.2 | 150 | 0.1 | 1.0 | 30.0 |
| Tetrabutylammonium salt of p-nitrobenzoic acid  | 0.05 | 30 | 0.14 | 1.2 | 28.0 |
| | 0.1 | 55 | 0.13 | 1.2 | 30.0 |
| | 0.2 | 120 | 0.11 | 1.2 | 31.0 |
| Tetrabutylammonium salt of p-chlorobenzal-p'-aminobenzoic acid 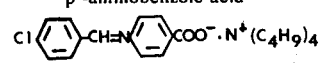 | 0.05 | 28 | 0.14 | 1.6 | 28.0 |
| Tetrabutylammonium salt of p-carboxybenzolamino-p'-chlorobenzene 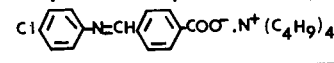 | 0.1 | 45 | 0.13 | 1.3 | 29.0 |

It is seen from Table 1 that by the addition to the nematic liquid crystal of a quaternary ammonium compound the speed of response from the time of the application of an electric potential to the nematic liquid crystal and its becoming turbid is accelerated and, in addition, the light transmittance is decreased as a result of the enhancement of the degree to which the nematic liquid crystal becomes turbid.

EXAMPLE 2

A liquid crystal mixture consisting of 23.0% by weight of p-methoxybenzal-p'-butylaniline, 42.7% by weight of p-ethoxybenzal-p'-butylaniline, 15.3% by weight of p-butoxybenzal-p'-butylaniline, 9.0% by weight of p-dodecyloxybenzal-p'-butylaniline and 10.0% by weight of anisylidene-p-aminophenylacetate is prepared. This mixture is in a liquid crystal state at temperatures ranging between −20° and 68°C.

To the foregoing liquid crystal mixture are added as additive various quaternary ammonium compounds in varying proportions to prepare several liquid crystal compositions containing the quaternary ammonium compounds in varying proportions. Then by operating as in Example 1 each of the these liquid crystal compositions and a liquid crystal mixture not incorporated with the quaternary ammonium compound are used for completely filling the cell described in Example 1 to thus form transparent thin layers of the liquid crystals. A direct current of 25 volts is then applied across the transparent electrodes. The current flowing between the electrodes, the speed of response at the time the transparent thin layer becomes turbid, and the light transmittance at the time the transparent thin layer became turbid are measured, with the results shown in Table 2.

Table 2

| Additive | Amount added (wt.%) | Current (μA/cm²) | Speed of response Rise time (sec) | Speed of response Decay time (sec) | Light transmittance (%) |
|---|---|---|---|---|---|
| — | — | 0.1 | 0.26 | 3.5 | 45 |
| Tetrabutylammonium salt of terephthalic acid  | 0.1 | 48 | 0.15 | 1.1 | 25.7 |
| Tetrabutylammonium salt of 2,4-dinitrobenzoic acid 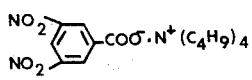 | 0.05 | 30 | 0.14 | 1.1 | 27.0 |
| | 0.1 | 64 | 0.16 | 1.2 | 28.6 |
| Tetrabutylammonium salt of p-butoxybenzoic acid 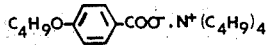 | 0.05 | 26 | 0.13 | 1.3 | 25.0 |
| | 0.1 | 50 | 0.14 | 1.4 | 26.0 |
| Tetrahexylammonium salt of benzoic acid 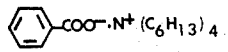 | 0.1 | 40 | 0.1 | 1.0 | 27.1 |
| | 0.2 | 75 | 0.12 | 0.9 | 24.0 |
| Tetrahexylammonium salt of p-methoxybenzal-p'-aminobenzoic acid 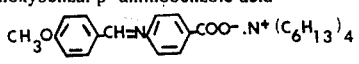 | 0.1 | 46 | 0.12 | 1.2 | 28.6 |
| | 0.2 | 80 | 0.11 | 1.1 | 30.0 |
| Tetrabutylammonium salt of formic acid HCOO⁻.N⁺(C₄H₉)₄ | 0.1 | 43 | 0.18 | 1.1 | 24.0 |
| Tetrabutylammonium salt of propionic acid C₂H₅COO⁻.N⁺(C₄H₉)₄ | 0.1 | 41 | 0.16 | 1.0 | 23.0 |
| Tetrabutylammonium salt of oxalic acid (H₉C₄)₄N⁺O⁻OC.COO⁻N⁺(C₄H₉)₄ | 0.1 | 39 | 0.13 | 0.9 | 22.5 |

EXAMPLE 3

A liquid crystal mixture consisting of 25.6% by weight of p-methoxybenzal-p'-butylaniline, 47.4% by weight of p-ethoxybenzal-p'-butylaniline, 17.0% by weight of p-butoxybenzal-p'-butylaniline and 10.0% by weight of p-dodecyloxybenzal-p'-butylaniline is prepared. This mixture is in a liquid crystal state at temperatures ranging from −15° to 68°C.

A transparent thin layer of the foregoing mixture is prepared by filling the cell such as used in Example 1.

A direct current of 25 volts is then applied across the transparent electrodes. The current flowing between the electrodes, the speed of response at the time the transparent thin layer becomes turbid and the light transmittance at the time the transparent thin layer became turbid are measured, with the results shown in Table 3.

Table 3

| Current ($\mu$A/cm) | Speed of response | | Light transmittance (%) |
|---|---|---|---|
| | Rise time (sec) | Decay time (sec) | |
| 0.055 | 0.28 | 4.0 | 55 | ous quaternary ammonium compounds in varying proportions, following which a cell such as described in Example 1 is filled completely with each of the so obtained liquid crystal compositions. Alternating current voltages of 25 volts and varying frequencies are then applied across the transparent electrodes, whereupon the transparent thin layer in each case becomes turbid. The current at this time, the speed of response at the time the transparent thin layer becomes turbid and the light transmittance at the time the transparent thin layer became turbid are measured, with the results shown in Table 4.

Table 4

| Additive | Amount added (wt.%) | Current ($\mu$A/cm$^2$) | Speed of response | | Light transmittance (%) | Frequency (KHZ) |
|---|---|---|---|---|---|---|
| | | | Rise time (sec) | Decay time (sec) | | |
| Tetrabutylammonium salt of p-aminobenzoic acid $NH_2-\langle\rangle-COO^-\cdot N^+(C_4H_9)_4$ | 0.05 | 25 | 0.12 | 1.0 | 20.0 | 1.0 |
| | 0.1 | 52 | 0.14 | 1.1 | 21.4 | 2.0 |
| Tetrabutylammonium salt of p-methoxybenzoic acid 0.1 $CH_3O-\langle\rangle-COO^-\cdot N^+(C_4H_9)_4$ | | 40 | 0.16 | 1.1 | 28.6 | 2.0 |
| Benzyltrimethylammonium hydroxide $\langle\rangle-CH_2-N^+-CH_3\cdot OH^-$ with $CH_3$, $CH_3$ | 0.05 | 23 | 0.17 | 1.1 | 25.0 | 1.0 |
| | 0.1 | 48 | 0.19 | 1.1 | 26.1 | 2.0 |
| Benzylhexadecyldimethylammonium hydroxide $C_{16}H_{33}$ $\langle\rangle-CH_2-N^+-CH_3\cdot OH^-$ $CH_3$ | 0.1 | 51 | 0.17 | 1.1 | 26.6 | 2.0 |
| Tetrabutylammonium salt of trichloroacetic acid $CCl_3-COO^-\cdot N^+(C_4H_9)_4$ | 0.05 | 25 | 0.11 | 1.1 | 24.3 | 2.0 |
| | 0.1 | 50 | 0.12 | 1.2 | 24.3 | 10.0 |
| | 0.25 | 85 | 0.15 | 1.4 | 25.7 | 10.0 |
| Tetrabutylammonium salt of acetic acid $CH_3COO^-\cdot N^+(C_4H_9)_4$ | 0.1 | 45 | 0.19 | 1.2 | 26.0 | 2.0 |
| Tetrabutylammonium salt of p-chlorobenzoic acid $Cl-\langle\rangle-COO^-\cdot N^+(C_4H_9)_4$ | 0.05 | 18 | 0.14 | 1.3 | 28.6 | 1.0 |

The foregoing liquid crystal mixture not incorporated with a quaternary ammonium compound does not become turbid on application of an alternating current voltage but gives the results shown in Table 3 only on application of a direct current voltage.

However, when a quaternary ammonium compound is added to this liquid crystal mixture, it becomes possible to render this liquid crystal mixture turbid even with the application of an alternating current voltage of high frequency. This fact will be shown by the following experiment.

Liquid crystal compositions are prepared by adding to the foregoing liquid crystal mixture as additive vari-

We claim:
1. A liquid crystal composition comprising a nematic liquid crystal and a quaternary ammonium compound selected from the group consisting of quaternary ammonium salts of mono and dicarboxylic acids represented by the formula

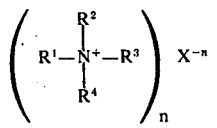

wherein X is a monofunctional carboxylate anion when $n$ is 1 and a difunctional carboxylate anion when $n$ is 2, wherein n is 1 or 2, and carbon atoms and quaternary ammonium hydroxides of the formula

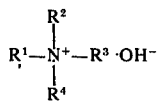

wherein $R^1$, $R^2$, $R^3$ and $R^4$ are each a hydrocarbon group of 1–20 carbon atoms.

2. The liquid crystal composition of claim 1 wherein said quaternary ammmonium compound is a quaternary ammonium salt of an aliphatic monocarboxylic acid.

3. The liquid crystal composition of claim 1 wherein said quaternary ammonium compound is a quaternary ammonium salt of an aliphatic dicarboxylic acid.

4. The liquid crystal composition of claim 1 wherein said quaternary ammonium compound is a quaternary ammonium salt of a carbocyclic monocarboxylic acid.

5. The liquid crystal composition of claim 1 wherein said quaternary ammonium compound is a quaternary ammonium salt of a carbocyclic dicarboxylic acid.

6. The liquid crystal composition of claim 1 wherein at least one of $R^1$, $R^2$, $R^3$ and $R^4$ is a hydrocarbon group of at least 3 carbon atoms.

7. The liquid crystal composition of claim 1 wherein said quaternary ammonium compound is present in an amount of 0.001–0.5% by weight, based on the nematic liquid crystal.

8. The liquid crystal composition of claim 2 wherein said aliphatic monocarboxylic acid is selected from the group consisting of formic acid, acetic acid, propionic acid, butyric acid, isobutyric acid, valeric acid, pivalic acid, lauric acid, acrylic acid, propiolic acid and methacrylic acid.

9. The liquid crystal composition of claim 3 wherein said aliphatic dicarboxylic acid is selected from the group consisting of oxalic acid, malonic acid, succinic acid, maleic acid and fumaric acid.

10. The liquid crystal composition of claim 4 wherein said carbocyclic monocarboxylic acid is selected from the group consisting of benzoic acid, p-chlorobenzoic acid, p-methylbenzoic acid, p-ethylbenzoic acid, p-methoxybenzoic acid, p-ethoxybenzoic acid, p-butoxybenzoic acid, p-nitrobenzoic acid, 2,4-dinitrobenzoic acid, p-aminobenzoic acid, p-chlorobenzal-p'-aminobenzoic acid, p-methoxybenzal-p'-aminobenzoic acid, p-carboxybenzalamino-p'-chlorobenzene, p-hydroxybenzoyl-p'-oxybenzoic acid, p-methoxybenz-oyl-p'-oxybenzoic acid, p-hydroxybenzoyl-p'-oxybenzoyl-p''-oxybenzoic acid, cinnamic acid, trans-p-phenylcinnamic acid, trans-p-acetoxycinnamic and trans-p-methoxycinnamic acid.

11. The liquid crystal composition of claim 5 wherein said carbocylic dicarboxylic acid is selected from the group consisting of phthalic acid, isophthalic acid and terephthalic acid.

12. The liquid crystal composition of claim 1 wherein said quaternary ammonium compound is said quaternary ammonium hydroxide and $R^1$, $R^2$, $R^3$ and $R^4$ are selected from the group consisting of alkyl of 1–20 carbon atoms, phenyl, xylyl, tolyl, and benzyl with the proviso that at least one of $R^1$, $R^2$, $R^3$ and $R^4$ is a hydrocarbon group of at least 3 carbon atoms.

13. The liquid crystal composition of claim 1 wherein said quaternary ammonium compound is a quaternary ammonium salt of a carboxylic acid selected from the group consisting of
  tetrabutylammonium salt of benzoic acid,
  tetrabutylammonium salt of p-nitrobenzoic acid,
  tetrabutylammonium salt of p-chlorobenzal-p'-aminobenzoic acid,
  tetrabutylammonium salt of p-carboxybenzolamino-p'-chlorobenzene,
  tetrabutylammonium salt of terephthalic acid,
  tetrabutylammonium salt of 2,4-dinitrobenzoic acid,
  tetrabutylammonium salt of p-butoxybenzoic acid,
  tetrahexylammonium salt of benzoic acid,
  tetrahexylammonium salt of p-methoxybenzal-p'-aminobenzoic acid,
  tetrabutylammonium salt of formic acid,
  tetrabutylammonium salt of propionic acid,
  tetrabutylammonium salt of oxalic acid,
  tetrabutylammonium salt of p-aminobenzoic acid,
  tetrabutylammonium salt of p-methoxybenzoic acid,
  tetrabutylammonium salt of trichloroacetic acid,
  tetrabutylammonium salt of acetic acid, and
  tetrabutylammonium salt of p-chlorobenzoic acid.

14. The liquid crystal composition of claim 1 wherein said quaternary ammonium compound is a quaternary ammonium hydroxide selected from the group consisting of benzyltrimethylammonium hydroxide and benzylhexadecyldimethylammonium hydroxide.

15. The nematic liquid crystal composition of claim 1 wherein said nematic liquid crystal is a mixture of p-methoxybenzal-p'-butylaniline and at least one p-alkoxybenzal-p'-butylaniline having an alkoxy group of 2–12 carbon atoms, the weight ratio of the former to the latter being in the range of 1 : 90 – 85 : 15.

* * * * *

UNITED STATES PATENT AND TRADEMARK OFFICE
CERTIFICATE OF CORRECTION

PATENT NO. : 3,956,168
DATED : May 11, 1976
INVENTOR(S) : Yoshi Arai et al.

It is certified that error appears in the above-identified patent and that said Letters Patent are hereby corrected as shown below:

Claim 1, column 9, line 1, before "carbon" insert -- wherein $R^1$, $R^2$, $R^3$ and $R^4$ are each a hydrocarbon group of 1-20 --

Claim 10, column 10, line 3, before "and" insert -- acid --

Signed and Sealed this

Third Day of August 1976

[SEAL]

Attest:

RUTH C. MASON
*Attesting Officer*

C. MARSHALL DANN
*Commissioner of Patents and Trademarks*